(12) United States Patent
Mailand

(10) Patent No.: US 8,668,014 B2
(45) Date of Patent: Mar. 11, 2014

(54) SUBSURFACE SAFETY VALVE FOR HIGH TEMPERATURE AND HIGH PRESSURE WELLS

(75) Inventor: Jason C. Mailand, The Woodlands, TX (US)

(73) Assignee: Tejas Research & Engineering, LLC, The Woodlands, TX (US)

( * ) Notice: Subject to any disclaimer, the term of this patent is extended or adjusted under 35 U.S.C. 154(b) by 320 days.

(21) Appl. No.: 13/026,412

(22) Filed: Feb. 14, 2011

(65) Prior Publication Data
US 2012/0205113 A1    Aug. 16, 2012

(51) Int. Cl.
*E21B 34/06*    (2006.01)

(52) U.S. Cl.
USPC ........................................ 166/319; 166/242.6

(58) Field of Classification Search
USPC ............................ 166/319, 321, 332.8, 242.6
See application file for complete search history.

(56) References Cited

U.S. PATENT DOCUMENTS

| | | | |
|---|---|---|---|
| 3,126,908 A | 3/1964 | Dickens | |
| 4,377,179 A | 3/1983 | Giebeler | |
| 4,467,870 A | 8/1984 | Langham | |
| 4,618,000 A * | 10/1986 | Burris, II | 166/373 |
| 7,624,807 B2 | 12/2009 | Vick | |
| 7,699,108 B2 * | 4/2010 | Bane et al. | 166/319 |
| 2007/0102927 A1 * | 5/2007 | Dubedout et al. | 285/382 |
| 2011/0174482 A1 * | 7/2011 | Verger et al. | 166/242.6 |

* cited by examiner

*Primary Examiner* — William P Neuder
(74) *Attorney, Agent, or Firm* — John J. Love; Claude Cooke, Jr.; Cooke Law Firm

(57) ABSTRACT

A subsurface safety valve particularly designed for high temperature and high pressure applications has an improved tubular joint connection that provides for a compliant metal to metal seal without adversely affecting the break out torque. The valve also includes axially extending grooves in the inner surface of the tubular housing in the area of a actuating piston bore to relief stresses in that area thereby reducing the risk of stress failure.

3 Claims, 2 Drawing Sheets

SUBSURFACE SAFETY VALVE FOR HIGH TEMPERATURE AND HIGH PRESSURE WELLS

BACKGROUND OF INVENTION

1. Field of the Invention

This invention is directed to a subsurface safety valve for oil and gas wells. The invention is particularly useful in a high pressure, high temperature well environment which is becoming more common due to the increased depth of many wells being drilled today.

2. Description of Related Art

Current subsurface safely valves normally include an upper tubular member 29, a valve body housing 15, and a lower tubular member 10 as shown in FIG. 1. A flapper type valve 13 is located in the valve body housing. Threaded connections are located at the juncture of the upper and lower tubular housing for connection to the valve body housing. Upper tubular member 20 includes a bore 9 in which a piston 22 is located for axial movement. A change in the pressure above and below the piston causes the piston to move, which in turn allows a compressed spring 18 to force a valve tube 24 upwards. This movement allows the flapper valve to deploy inwardly over a valve seat 52 in the valve body to prevent flow of fluid to the surface. Such an arrangement is shown in FIG. 1.

As wells are drilled deeper and deeper, the temperatures and pressures increase. Therefore it is necessary to design subsurface safety valves that will not fail under high temperatures and pressure conditions.

One solution with respect to the treaded couplings is simply to make thicker tubular housings. However, this solution has two serious adverse drawbacks. For safety valves operating at pressures around 10,000-15,000 psi the original load bearing shoulder geometry was determined by the outside diameter of the box connection. The shoulder was sufficiently loaded to provide high break-out torque levels, that is the contact pressure was intentionally designed to be high so the threads would have a break-out torque higher than the make-up torque. Also the normal connection allowed more radial compliance for an adequate metal-to-metal seal. Compliance is important to insure that the seal can be maintained under varying temperature and load conditions. Thicker tubular connections will result in lower contact pressure on the load bearing surface due to the increased contact area at the same makeup torque. This will decrease the break-out torque. Secondly, the compliance of the metal to metal seal will be significantly decreased which will lead to external pressure leakage problems.

Another area of concern with increasing pressure and temperature is the piston bore. The portions of the upper tubular member near the inner and outer regions around the piston bore are subject to increased stresses which cause failure at these areas.

BRIEF SUMMARY OF THE INVENTION

The invention disclosed herein overcomes the problems of the prior art mentioned above by providing an annular recess at the load bearing shoulder at the joint of the tubular members. This improves the metal to metal seal compliance and improves the contact pressure on the load bearing shoulder from the torque make-up to help create high break-out torques.

Additionally, a relief cut-out channel is formed in the inner surface of the upper tubular housing along each side of the piston bore in a manner disclosed below. The cut-outs result in a reduction of the average stress between the piston bore and the inner surface of the upper tubular housing. The effect of adding the relief cuts is to reduce the hoop stresses within the thin section by removing load supporting material adjacent to the piston hole. The free surfaces left by the relief cuts can longer support tangential loads, thereby reducing the hoop stresses within the section. The corresponding increase in the bending stress at the top of the relief cuts shows how the depth of the cuts, their location, and shape can be used to trade for a reduction of the membrane stress in the thin section under the piston hole.

BRIEF DESCRIPTION OF THE SEVERAL VIEWS OF THE DRAWING(S)

DETAILED DESCRIPTION OF THE INVENTION

Figure 1:
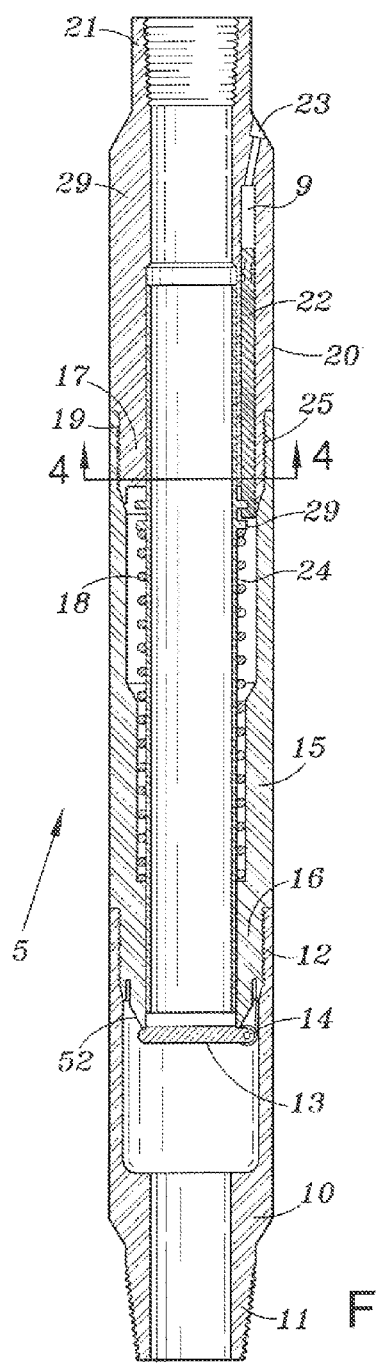
FIG. 1 is a cross-sectional view of a surface controlled subsurface safety valve according to an embodiment of the invention.
Figure 2:
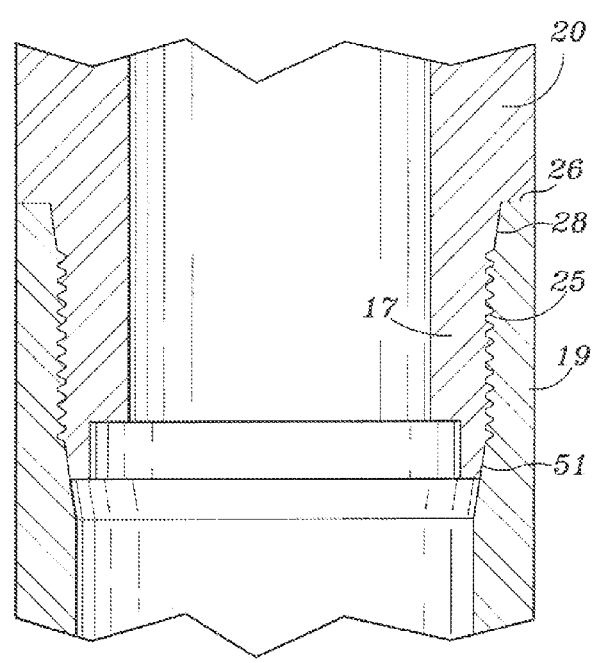
FIG. 2 is a cross-sectional view of a typical joint between the upper tubular member and the valve body housing.

A subsurface safety valve 5 according to an embodiment of the invention is shown in FIG. 1 and includes an upper tubular member 29 having a conventional coupling 21 for connection to a production tubular for example. The middle portion 20 of the top upper tubular member includes an inlet port 23 for hydraulic fluid and a piston 22 located within piston bore 9. The lower portion 17 of the upper tubular member 20 includes a pin connection that is threadly connected to upper portion 19 of the valve body housing 15 at 25, see FIG. 2. The connection between the upper tubular member 20 and valve body housing includes a load bearing shoulder at 26 and a compliant metal to metal seal at 28. Flapper valve 13 and hinge 14 are carried by the lower portion 16 of the valve body housing 15. A hollow sleeve 24 and a spring 18 which abuts a shoulder 29 on the sleeve 24 are located within the valve housing. A lower tubular member 10 is threadly connected to valve body 15 at 12 and includes a lower portion 11 for attachment to production tubulars or the like in a known manner.

Figure 3:
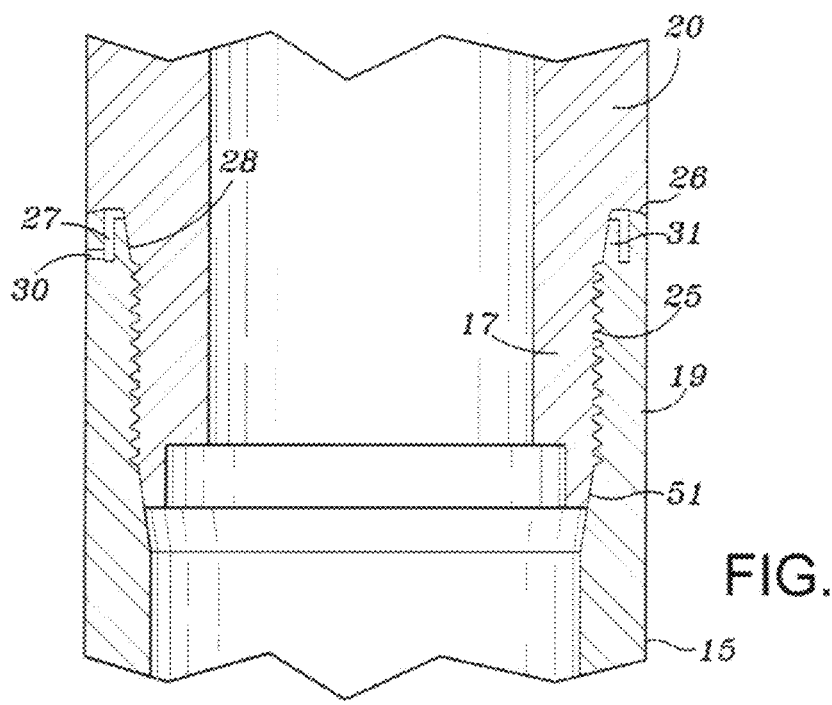
FIG. 3 is a cross-sectional view of an embodiment of the joint connection according to an embodiment of the invention.

An embodiment of the joint coupling according to the invention is shown in FIG. 3. An annular recess 27 is formed on the upper radial surface of valve housing 19 at the load bearing shoulder 26 as shown in FIG. 3. This forms an annular ridge portion 31 which has a relatively thin thickness which allows the ridge portion to flex as the two members 20, 15 are threaded together thus improving the metal to metal compliant seal. This arrangement makes it possible to provide a test port at 30 to test the integrity of the metal to metal seal. A second metal to metal seal is located at 51.

Figure 4:
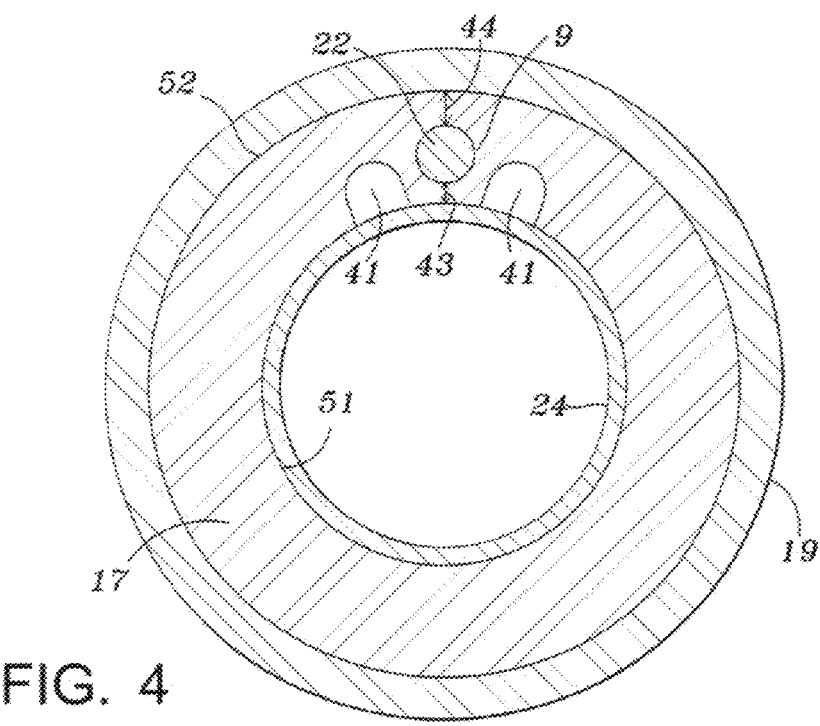
FIG. 4 is a cross-section along line 4-4 of FIG. 1 showing the relief cuts according to an embodiment of the invention.

A second aspect of the invention is illustrated in FIG. 4. Lower portion 17 of the upper tubular member is surrounded by the upper portion 19 of the valve body 15. Piston 22 is located within piston bore 9. There is a relatively thin inner wall portion 43 between the piston bore 9 and the inner surface 51 of lower portion 17 of the upper tubular member 20. There is also an outer relatively thin wall portion 44 between the piston bore 9 and outer surface 52 of lower tubular member portion 17. A pair of axially extending relief grooves 41 are cut into the inner surface 51 of member 17 and extend approximately to the half-way point between surface 51 and 52. This distance can vary according to the conditions within the well, as well as, the point at which the safety valve is deployed. These grooves or relief cuts reduce the hoop stresses within thin wall section 43. The free surfaces left by the grooves can no longer support tangential loads, thereby reducing the hoop stresses within the section.

Although the present invention has been described with respect to specific details, it is not intended that such details should be regarded as limitations on the scope of the invention, except to the extent that they are included in the accompanying claims.

It is understood that modifications to the invention may be made as might occur to one skilled in the field of the invention within the scope of the appended claims. All embodiments contemplated hereunder which achieve the objects of the invention have not been shown in complete detail. Other embodiments may be developed without departing from the spirit of the invention or from the scope of the appended claims. Although the present invention has been described with respect to specific details, it is not intended that such details should be regarded as limitations on the scope of the invention, except to the extent that they are included in the accompanying claims.

I claim:

1. A safety valve for a well comprising:
   first tubular member having a threaded portion and a first load bearing shoulder proximate the threaded portion;
   a valve body member having a complimentary threaded portion engaging the threaded portion of the first tubular member, and a second load bearing shoulder engaging the first load bearing shoulder;
   an axially extending recess extending from one of the load bearing surfaces to an inner portion in one of the tubular members or valve body; and
   a lower tubular member connected to the valve body and having a connection portion for connecting the valve to a pipe or other tubular.

2. A safety valve for use in high temperature, high pressure wells comprising:
   a first tubular member housing an axially extending piston bore formed in a wall portion of the tubular member;
   a piston located within the piston bore;
   a valve body housing connected to the first tubular member; and
   a pair of non-annular grooves formed on an inside surface of the first tubular member, the grooves being located to one side and the other of the piston bore so as to reduce the hoop stresses within the portion of the first tubular wall portion between the piston bore and the inner surface of the first tubular member, each groove having a longitudinal axis that extends substantially parallel to a longitudinal axis of the piston bore.

3. The safety valve of claim 2 further including a lower tubular member connected to the lower portion of the valve body housing.

* * * * *